(12) United States Patent
Lee et al.

(10) Patent No.: US 9,294,760 B2
(45) Date of Patent: Mar. 22, 2016

(54) IMAGE DISPLAY DEVICE AND CONTROLLING METHOD THEREOF

(75) Inventors: Namsu Lee, Seoul (KR); Hyunghoon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 427 days.

(21) Appl. No.: 13/535,263

(22) Filed: Jun. 27, 2012

(65) Prior Publication Data

US 2013/0033583 A1 Feb. 7, 2013

(30) Foreign Application Priority Data

Jun. 28, 2011 (KR) ........................ 10-2011-0062655

(51) Int. Cl.
- H04N 5/235 (2006.01)
- H04N 5/57 (2006.01)
- H04N 5/58 (2006.01)
- H04N 13/04 (2006.01)
- H04N 13/02 (2006.01)

(52) U.S. Cl.
CPC ........... *H04N 13/0409* (2013.01); *H04N 5/235* (2013.01); *H04N 5/57* (2013.01); *H04N 13/0239* (2013.01); *H04N 13/0454* (2013.01); *H04N 5/58* (2013.01)

(58) Field of Classification Search
CPC .......... H04N 5/57; H04N 5/58; H04N 5/235; H04N 13/0409; H04N 13/0454; H04N 13/0239

See application file for complete search history.

(56) References Cited

U.S. PATENT DOCUMENTS

| 6,111,596 A | 8/2000 | Haskell et al. |
| 7,795,821 B2 * | 9/2010 | Jun ............................... 315/308 |
| 8,326,084 B1 * | 12/2012 | Marrion et al. ............... 382/285 |
| 8,547,417 B2 * | 10/2013 | Pan ................................ 348/42 |
| 8,723,930 B2 * | 5/2014 | Lim et al. ......................... 348/51 |
| 2003/0122928 A1 * | 7/2003 | Yokonuma ...................... 348/96 |
| 2008/0013001 A1 * | 1/2008 | Jang et al. ....................... 349/15 |

(Continued)

FOREIGN PATENT DOCUMENTS

| EP | 0540137 B1 * | 6/1996 |
| EP | 2333763 | 6/2011 |

(Continued)

OTHER PUBLICATIONS

European Patent Office Application Serial No. 12004734.5, Search Report dated Aug. 5, 2015, 5 pages.

(Continued)

*Primary Examiner* — William C Vaughn, Jr.
*Assistant Examiner* — Lindsay Uhl
(74) *Attorney, Agent, or Firm* — Lee, Hong, Degerman, Kang & Waimey

(57) ABSTRACT

An image display device and controlling method thereof are disclosed, by which a 3D stereoscopic image are more comfortably appreciated in consideration of appreciation environment. In a mobile terminal including a display unit configured to variably display a 2D (2-dimensional) image and a 3D stereoscopic image of a parallax barrier type, the controlling method includes determining a play mode of a source image including a left eye image and a right eye image for implementation of the 3D stereoscopic image, if the determined play mode is a 3D play mode, determining a brightness of the source image, and enhancing an output brightness of the source image in accordance with an output brightness of the source image.

6 Claims, 15 Drawing Sheets

(56) References Cited

U.S. PATENT DOCUMENTS

| | | | |
|---|---|---|---|
| 2008/0165116 A1* | 7/2008 | Herz et al. | 345/102 |
| 2008/0170806 A1* | 7/2008 | Kim | 382/285 |
| 2009/0040297 A1* | 2/2009 | Harada et al. | 348/54 |
| 2009/0298547 A1* | 12/2009 | Kim et al. | 455/566 |
| 2010/0039503 A1 | 2/2010 | Lin et al. | |
| 2010/0321528 A1* | 12/2010 | Yu et al. | 348/231.2 |
| 2011/0157257 A1* | 6/2011 | Bennett et al. | 345/690 |
| 2011/0161843 A1* | 6/2011 | Bennett et al. | 715/760 |
| 2011/0221871 A1* | 9/2011 | Sakaniwa et al. | 348/51 |
| 2011/0273480 A1* | 11/2011 | Park et al. | 345/690 |
| 2013/0107017 A1* | 5/2013 | Endo | 348/49 |
| 2013/0222553 A1* | 8/2013 | Tsuchita | 348/49 |
| 2013/0258073 A1* | 10/2013 | Kozak et al. | 348/56 |

FOREIGN PATENT DOCUMENTS

| | | | |
|---|---|---|---|
| JP | 2008187385 | * | 8/2008 |
| WO | 2006/004342 | | 1/2006 |
| WO | 2006/035376 | | 4/2006 |

OTHER PUBLICATIONS

European Patent Office Application Serial No. 12004734.5, Search Report dated Oct. 22, 2015, 11 pages.

* cited by examiner (a)

2D
3D
user's view (b)

(a)

(b)

(c)

(a)

(b)

# US 9,294,760 B2

IMAGE DISPLAY DEVICE AND CONTROLLING METHOD THEREOF

Pursuant to 35 U.S.C. §119(a), this application claims the benefit of earlier filing date and right of priority to Korean Patent Application No. 10-2011-0062655, filed on Jun. 28, 2011, the contents of which are hereby incorporated by reference herein in their entirety.

BACKGROUND OF THE INVENTION

1. Field of the Invention

The present invention relates to an image display device terminal, and more particularly, to an image display device and controlling method thereof. Although the present invention is suitable for a wide scope of applications, it is particularly suitable for creating and appreciating a 3D stereoscopic image more comfortably in consideration of appreciation environment.

2. Discussion of the Related Art

Recently, the demand for a display device for creating and appreciating a 3D stereoscopic image more comfortably in consideration of appreciation environment is rising. Especially, the demand for a display device of a terminal type is increasingly rising. Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and diversify the terminal functions, it may be able to consider improving structural parts and/or software parts of the terminal.

Recently, a 3D stereoscopic image of a binocular disparity type is implemented via a display unit of a mobile terminal. The 3D stereoscopic images may be classified into a special glasses required system and a glasses-free system that requires no glasses.

However, the glasses-free system is disadvantageous in that an output image looks darker than a 2D planar image due to the limited implementation of the glasses-free system. Hence, the demand for a method of appreciating a 3D stereoscopic image more comfortably is rising.

SUMMARY OF THE INVENTION

Accordingly, the present invention is directed to an image display device and controlling method thereof that substantially obviate one or more problems due to limitations and disadvantages of the related art.

An object of the present invention is to provide an image display device and controlling method thereof, by which a user can be provided with a more convenient and comfortable 3D stereoscopic image appreciating environment.

Another object of the present invention is to provide an image display device and controlling method thereof, by which a 3D stereoscopic image can be appreciated without visual inconvenience caused to a user in consideration of a 3D stereoscopic image output environment.

A further object of the present invention is to provide an image display device and controlling method thereof, by which a source image can be created to provide a 3D stereoscopic image in consideration of display brightness.

Technical tasks obtainable from the present invention are non-limited the above-mentioned technical task. And, other unmentioned technical tasks can be clearly understood from the following description by those having ordinary skill in the technical field to which the present invention pertains.

To achieve these objects and other advantages and in accordance with the purpose of the invention, as embodied and broadly described herein, a method of controlling a mobile terminal according to one embodiment of the present invention may include the steps of photographing a left eye image and a right eye image for 3D stereoscopic image implementation via a $1^{st}$ camera and a $2^{nd}$ camera and creating a source image by processing a signal of the images photographed via the $1^{st}$ and $2^{nd}$ cameras, wherein if a photograph mode of each of the $1^{st}$ and $2^{nd}$ cameras is a 3D stereoscopic image photograph mode, the source image creating step comprises the step of enhancing a brightness of the image signal.

In another aspect of the present invention, a method of controlling a mobile terminal, which includes a display unit configured to variably display a 2D (2-dimensional) image and a 3D stereoscopic image of a parallax barrier type, according to one embodiment of the present invention may include the steps of determining a play mode of a source image including a left eye image and a right eye image for implementation of the 3D stereoscopic image, if the determined play mode is a 3D play mode, determining a brightness of the source image, and enhancing an output brightness of the source image in accordance with an output brightness of the source image.

In another aspect of the present invention, a mobile terminal according to one embodiment of the present invention may include a display unit configured to variably display a 2D (2-dimensional) image and a 3D stereoscopic image of a parallax barrier type and a controller, if a source image including a left eye image and a right eye image is displayed via the display unit, determining a play mode, the controller, if the determined play mode is a 3D stereoscopic image play mode, controlling an output brightness of the source image to be raised.

In another aspect of the present invention, a mobile terminal according to one embodiment of the present invention may include a display unit configured to variably display a 2D (2-dimensional) image and a 3D stereoscopic image of a parallax barrier type, a memory unit configured to store a source image including a left eye image and a right eye image for implementation of the 3D stereoscopic image, a triggering module configured to determine a brightness of the source image and a play mode of the source image, a display subsystem (DSS), if the determined play mode is a 3D stereoscopic image play mode, adjusting an output gamma value of the source image in accordance with the determined brightness, and a backlight control module configured to control a brightness adjustment of a backlight of the display unit in accordance with the determined brightness of the source image.

In a further aspect of the present invention, a mobile terminal according to one embodiment of the present invention may include a $1^{st}$ camera configured to photograph a left eye image of a source image to implement a 3D stereoscopic image, a $2^{nd}$ camera configured to photograph a right eye image of the source image, an imaging subsystem (ISS) configured to process an image signal taken via the $1^{st}$ camera and the $2^{nd}$ camera, a triggering module configured to determine a photograph mode of each of the $1^{st}$ camera and the $2^{nd}$ camera, and a brightness control module, if the triggering module determines that the photograph mode is a 3D stereoscopic image photograph mode, controlling the imaging subsystem to enhance a brightness of the image signal.

Accordingly, the present invention provides the following effects and/or advantages.

First of all, the present invention minimizes a brightness difference between a 3D stereoscopic image and a 2D image using a display device according to at least one embodiment of the present invention, thereby providing a user with a more comfortable environment for appreciating the 3D stereoscopic image.

Secondly, the present invention adjusts a brightness of a 3D image in accordance with an appreciation environment, thereby minimizing visual inconvenience in appreciating a 3D stereoscopic image.

Thirdly, the present invention creates a source image of a 3D stereoscopic image in consideration of brightness adjustment using at least two cameras.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

In the following detailed description, it is assumed that an image display device is a terminal. Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
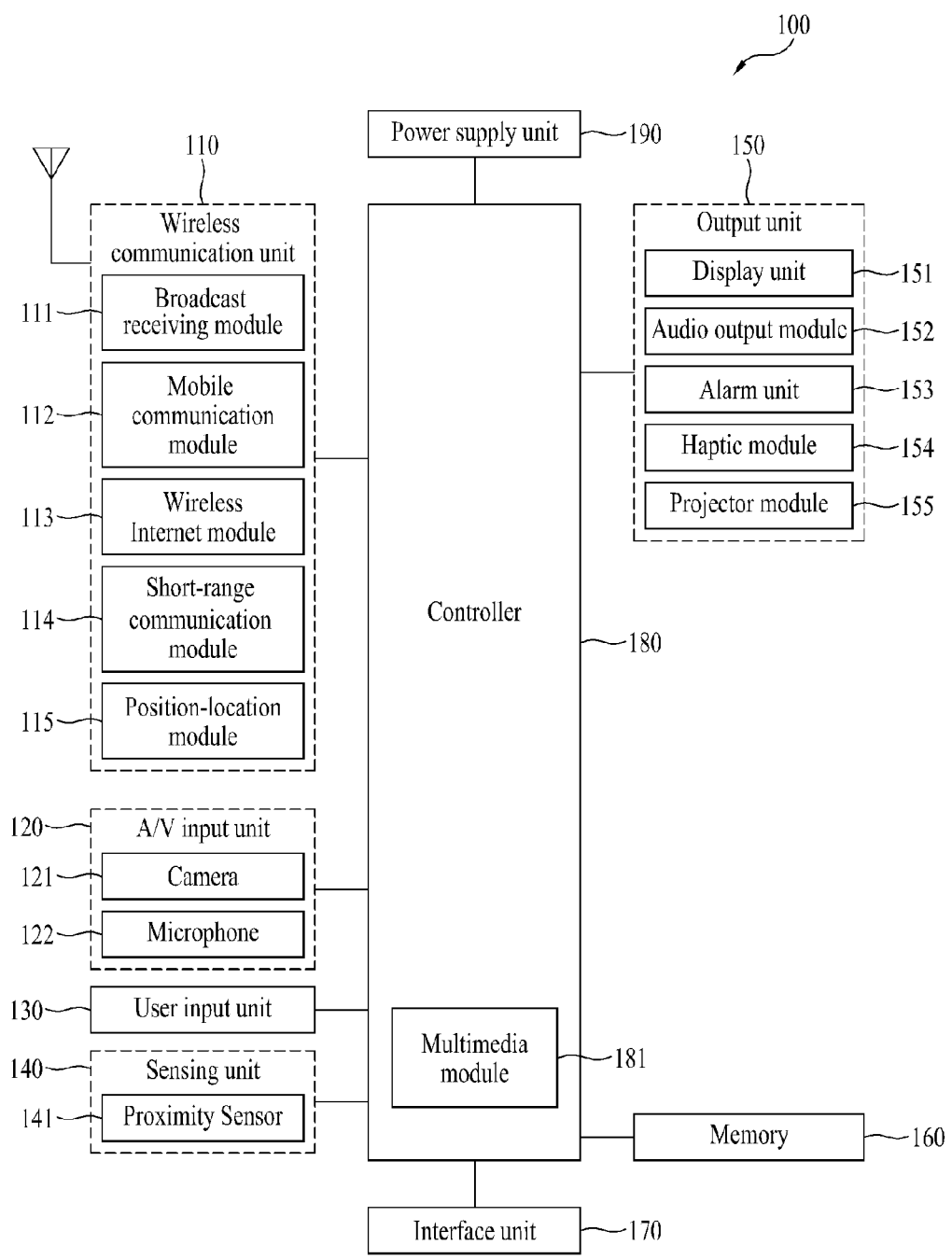
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), LTE (Long Term Evolution) and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (NV) input unit 120 is shown configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
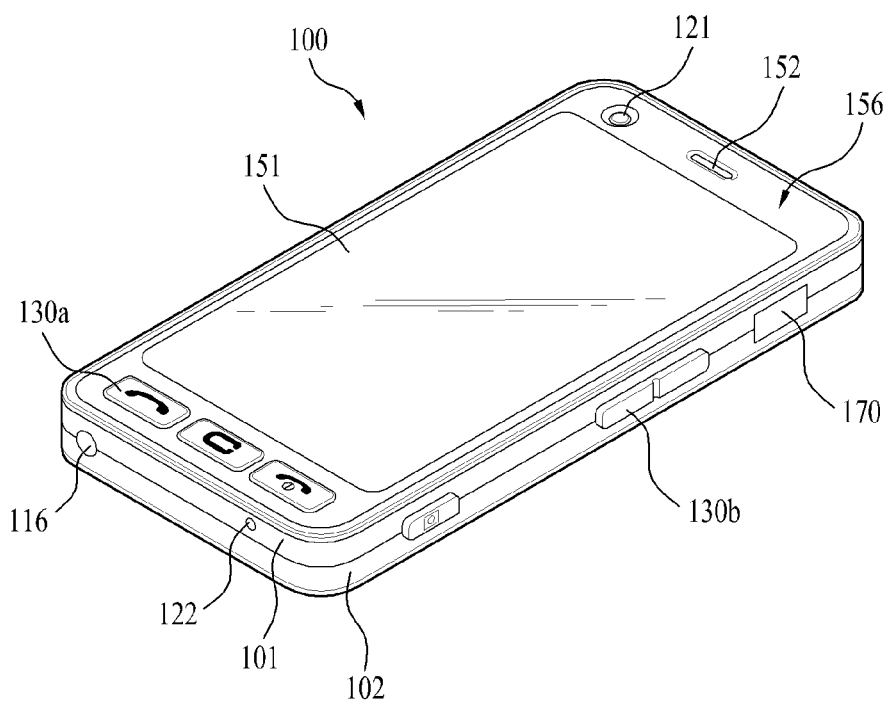
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 170 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Implementation of Stereoscopic 3D Images

In the following description, a method of displaying a 3D image in a mobile terminal applicable to embodiments of the present invention and a display unit configuration for the same are explained.

One of schemes for implementing a 3D image is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 3 as follows.

Figure 3:
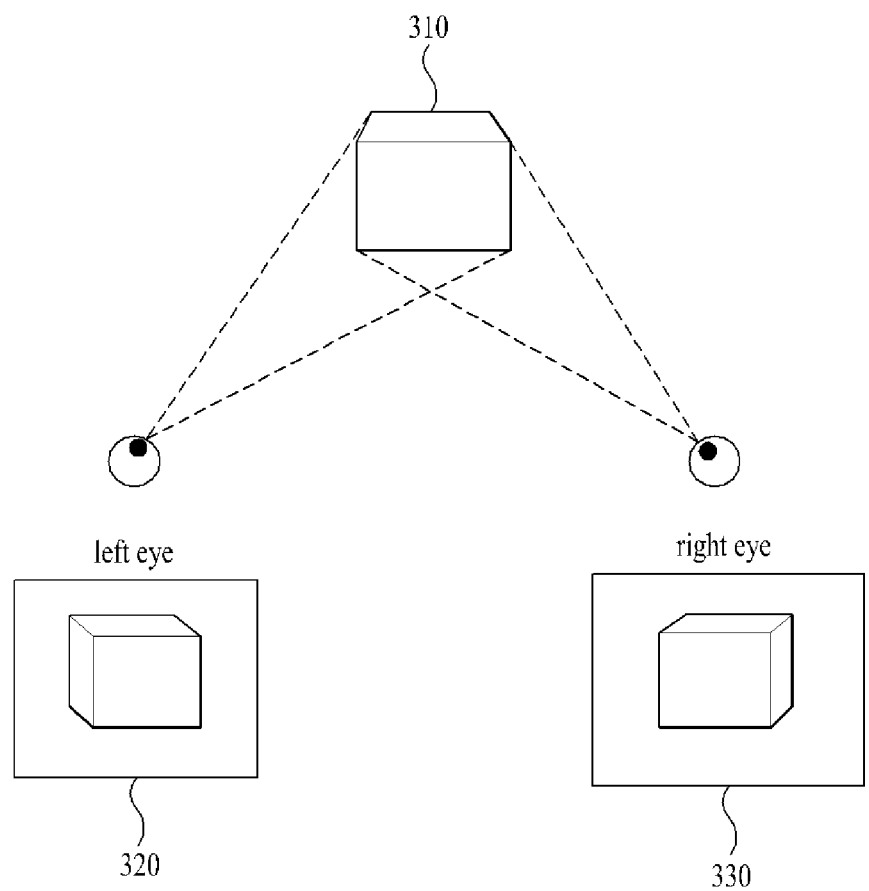
FIG. 3 is a diagram for describing the principle of binocular disparity.

FIG. 3 is a diagram for explaining the principle of binocular disparity.

Referring to FIG. 3, assume a situation that a hexahedron 310 is positioned as a subject in front below an eye's height to be seen through human eyes. In this case, a left eye is able to see a left eye planar image 320 revealing three facets including a top side, a front side and a left lateral side of the hexahedron 310 only. And, a right eye is able to see a right eye planar image 330 revealing three facets including the top side, the front side and a right lateral side of the hexahedron 310 only.

Even if a real thing is not actually positioned in front of both eyes of a user, if the left eye planar image 320 and the right eye planar image 330 are set to arrive at the left eye and the right eye, respectively, a user is able to substantially sense the hexahedron 310 as if looking at the hexahedron 310 actually.

Thus, in order to implement the 3D image belonging to the second category in the mobile terminal 100, images of the same object should arrive at both eyes in a manner of being discriminated from each other for the left and right eye images of the same object with a predetermined parallax.

In the following description, 3D depth attributed to the binocular disparity is explained with reference to FIG. 4.

Figure 4:
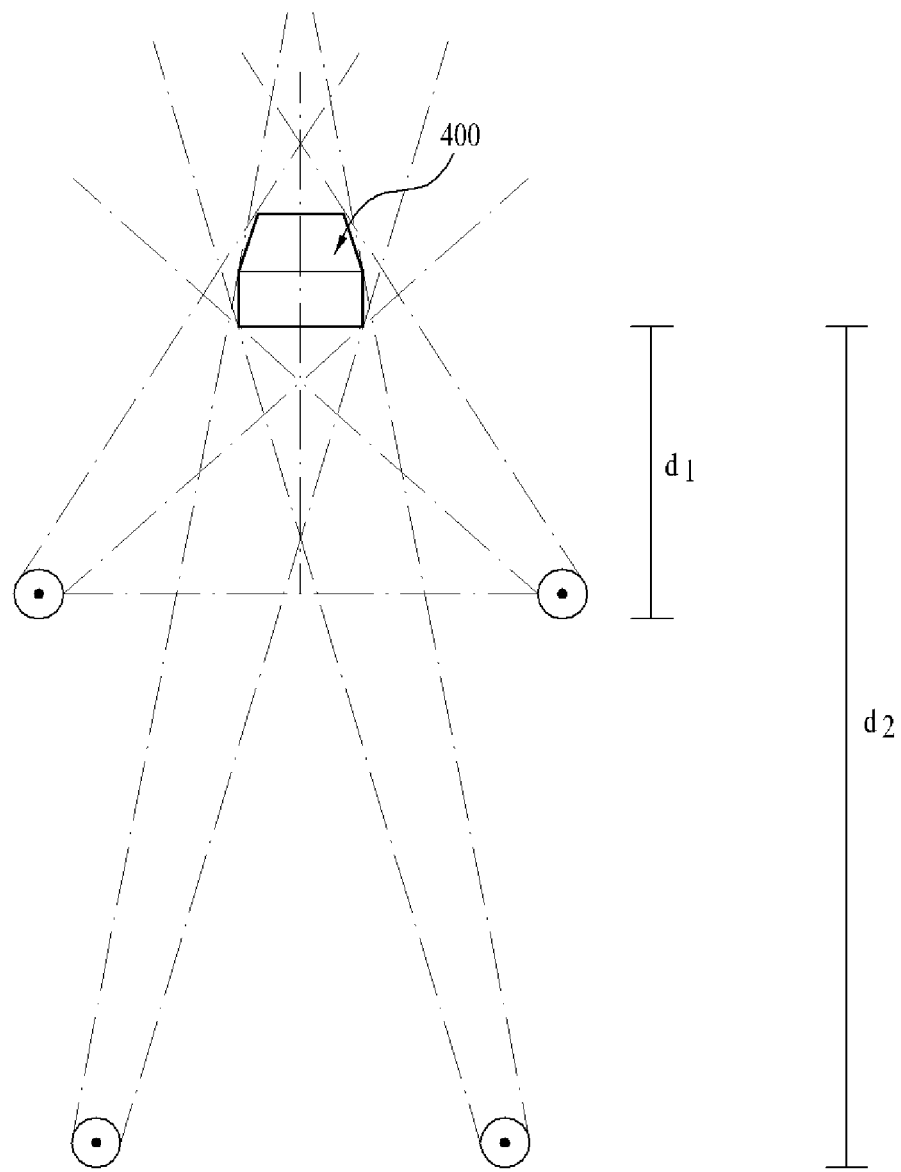
FIG. 4 is a diagram for the concept of a sense of distance and 3D depth attributed to binocular disparity.

FIG. 4 is a diagram for concept of a sense of distance and 3D depth attributed to binocular disparity.

Referring to FIG. 4, a lateral side ratio of an image entering each eyeball in view of a hexahedron 400 in a distance d1 trough both eyes is relatively higher than that in a distance d2, whereby a difference between images seen through both eyes increases. Moreover, an extent of a stereoscopic effect sensed by a user in view of the hexahedron 400 in the distance d1 can become higher than that in view of the hexahedron 400 in the distance d2. In particular, when a thing is seen through both eyes of a user, a closer subject gives a greater stereoscopic effect, whereas a farther subject gives a smaller stereoscopic effect.

Such a difference in stereoscopic effect can be digitized into a 3D depth or a 3D level. In the following description, a high stereoscopic effect of a thing situated closer shall be represented as a low 3D depth and a low 3D level. And, a low stereoscopic effect of a thing situated farther shall be represented as a high 3D depth and a high 3D level. As the definition of the 3D depth or level is relatively set, a classification reference for the 3D depth or level and an increasing/decreasing direction of the 3D depth or level is changeable.

In order to discriminate the above-mentioned two categories from each other in this disclosure, a stereoscopic image belonging to the first category shall be named '2D stereoscopic image' and a stereoscopic image belonging to the second category shall be named '3D stereoscopic image'.

A method of implementing a 3D stereoscopic image is described as follows.

As mentioned in the following description, in order to implement a 3D stereoscopic image, an image for a right eye and an image for a left eye need to arrive at both eyes in a manner of being discriminated from each other. For this, Parallax Barrier Scheme is explained as follows.

The parallax barrier scheme enables different images arrive at both eyes in a manner of controlling a propagating direction of light by electronically driving a cutoff device provided between a general display and both eyes. This is explained with reference to FIGS. 5 and 6 as follows.

Figure 5:
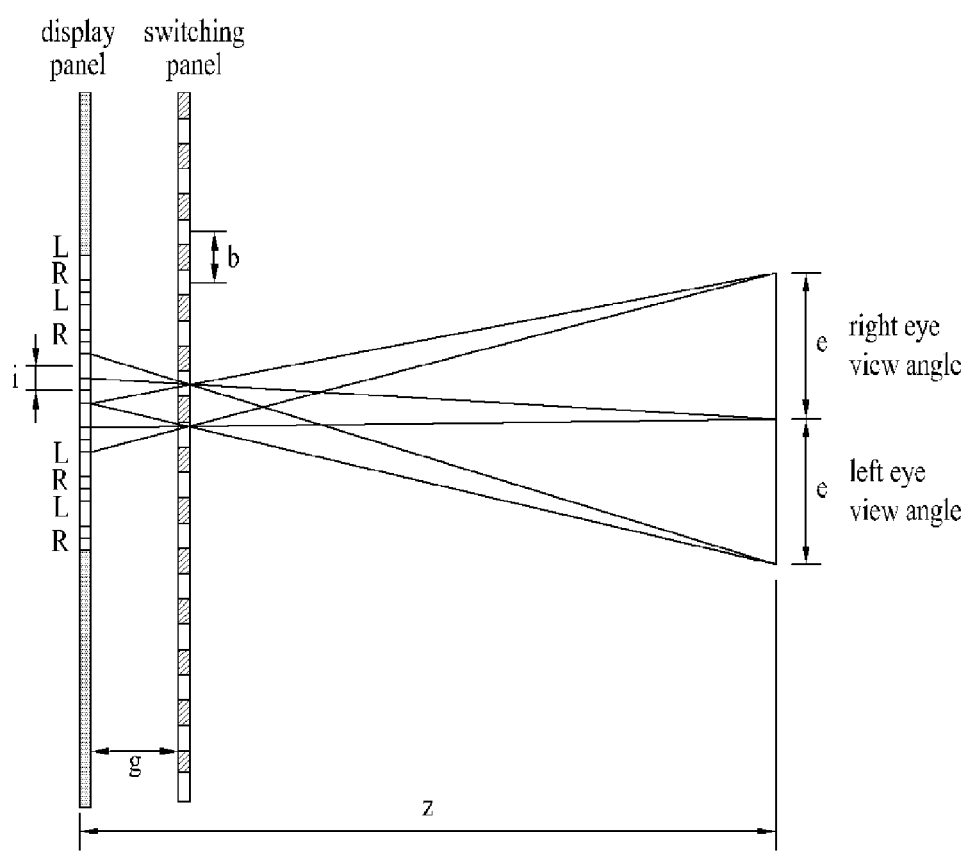
FIG. 5 is a diagram for describing the principle of a 3D stereoscopic image displaying method using binocular disparity applicable to embodiments of the present invention.

FIG. 5 is a diagram for describing the principle of a 3D stereoscopic image displaying method using binocular disparity applicable to embodiments of the present invention.

Referring to FIG. 5, in order to display a 3D stereoscopic image, the display unit 151 may include a display panel and a switching panel attached to a top surface of the display panel. The switching panel is electrically controllable and is able to partially cut off or transmit lights to arrive at both eyes. In particular, the display panel may include such a general display device as LCD, LED, AMOLED and the like.

In FIG. 5, 'b' indicates a barrier space of a switching panel, 'g' indicates a gap between a switching panel and a display panel, and 'z' indicates a distance between an eye view position and a display panel. When two images are synthesized by a pixel unit (L, R), as shown in FIG. 5, the switching panel may operate in a manner that a view angle of a right eye and a view angle of a left eye correspond to a pixel included in the right image and a pixel included in the left image, respectively.

In case of attempting to output a 3D stereoscopic image, the switching panel is turned on to separate incident view angles from each other. In case of attempting to output a 2D image, the switching panel is turned off to let the incident view angle pass through. Hence, if the switching panel is turned off, binocular disparity is not separated. The above-configured switching panel facilitates a switching between 2D and 3D, thereby enabling a user to advantageously appreciate a 3D stereoscopic image without wearing polarizing glasses or active-shutter type glasses.

FIG. 5 shows that the parallax barrier works in one axial direction for example, by which the present invention may be non-limited. Alternatively, the present invention may adopt a parallax barrier capable of working in at least two axial directions in accordance with a control signal generated by the controller 180.

Figure 6:
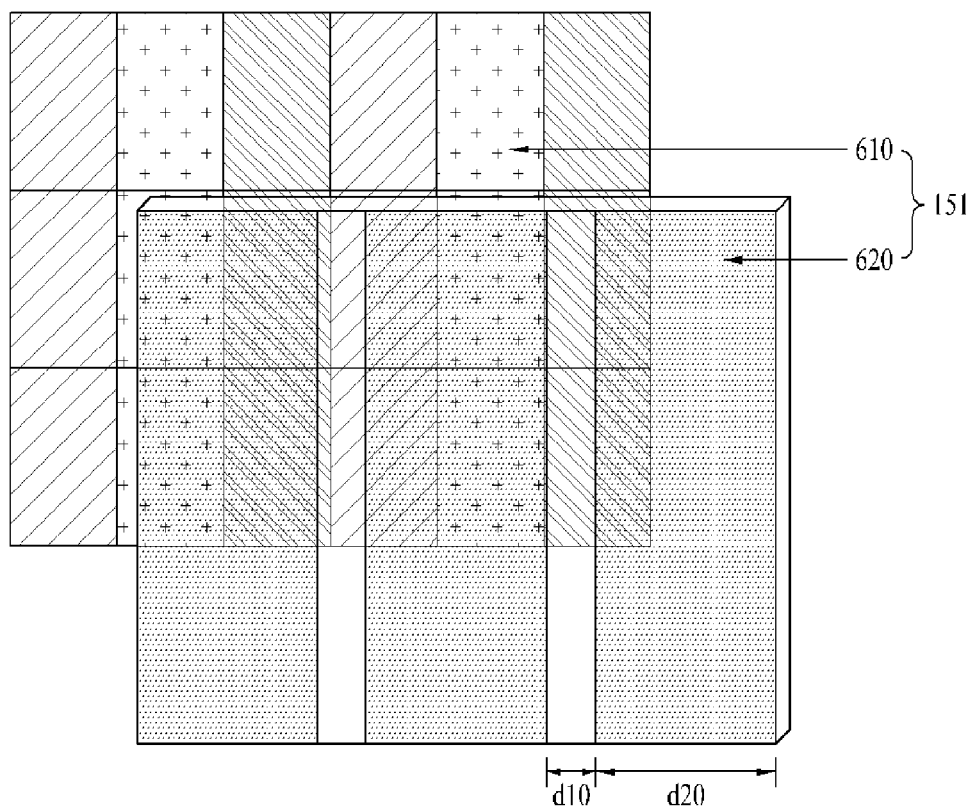
FIG. 6 is a diagram to illustrate the implementation of a parallax barrier applicable to embodiments of the present invention.

FIG. 6 is a diagram to illustrate the implementation of a parallax barrier applicable to embodiments of the present invention.

In particular, FIG. 6 shows a stereoscopic arrangement configuration of the display unit including the display panel and the switching panel described with reference to FIG. 5.

Referring to FIG. 6, the switching panel 620 is superposed on the display panel 610. Assume that the switching panel 620 includes an LCD device. This is to apply the property that liquid crystal arrangement within LCD is changed to become transparent or non-transparent in accordance with a presence or non-presence of electricity. While the switching panel 620 is not active, most of the light generated from the display panel 610 is transmitted through the switching panel 620. On the contrary, while the switching panel 620 is active, the light corresponding to a region indicated by a reference number 'd10' is transmitted through the switching panel 620 but the light corresponding to a region indicated by a reference number 'd20' is cut off by the switching panel 620. Thus, the switching panel 620 operates to transmit light in direction preferable to implement a 3D stereoscopic image only. In this case, a ratio of d10 to d20 may be variable.

Yet, since the light amounting to a size of the region d20 is cut off in case of the active switching panel, luminance (or brightness) of a 3D stereoscopic image is physically and inevitably lowered. In particular, when a 2D image is outputted via the display unit, the switching panel 620 needs not to be active. Hence, the luminance of the light generated from the display panel 610 is lowered by an amount of unique transparency of the switching panel 620. On the other hand, when a 3D stereoscopic image is outputted via the display unit, the switching panel 620 is active to cut off the light generated from the display panel 610 at the ratio of d10 to d20. Hence, the luminance of an output image is disadvantageously further lowered than that of the outputted 2D image. In order to solve this problem, it may increase an amount of the transmitted light in a simple manner of raising a portion of the d10 and lowering a portion of the d20. If so, the light supposed to arrive at a user's left eye and the light supposed to arrive at a user's right eye fail in being exactly separated from each other, whereby crosstalk may possibly occur.

3D Stereoscopic Image Brightness Compensating Method

In order to solve the aforementioned problem, one embodiment of the present invention provides various kinds of methods of compensating an image for brightness in creating/playing a left eye image and a right eye image to implement a 3D stereoscopic image.

For clarity and convenience of the following description, assume that a mobile terminal mentioned in the following description includes at least one of the components shown in FIG. 1. In particular, a mobile terminal, to which the present invention is applicable, includes a display unit capable of providing a user with a 3D stereoscopic image by one of the above-described 3D parallax barrier systems. For clarity and convenience, both left and right eye images for the implementation of a 3D stereoscopic image are named 'source image'. And, an image display device is assumed as a mobile terminal type device, by which the present invention may be non-limited.

Methods for compensating an image for brightness in crating/playing left and right eye images according to one embodiment of the present invention may be mainly classified into two types. First of all, according to the first type, when a source image for a 3D stereoscopic image is created, correction is performed to compensate for attenuation of brightness in advance. Secondly, according to the second type, when a 3D stereoscopic image is outputted using a prepared source image, the 3D stereoscopic image is outputted in a manner of being corrected to compensate for brightness attenuation. In this case, the prepared source image may conceptionally include a source image saved as a file in the memory 160 and a source image downloaded/streamed by real time by wire/wireless.

And, the source image may include a still image or a video.

A configuration of a mobile terminal capable of implementing the aforementioned methods of the two types and a method of controlling the mobile terminal are described as follows.

First of all, a configuration of a mobile terminal capable of directly creating a source image is described with reference to FIG. 7.

Figure 7:
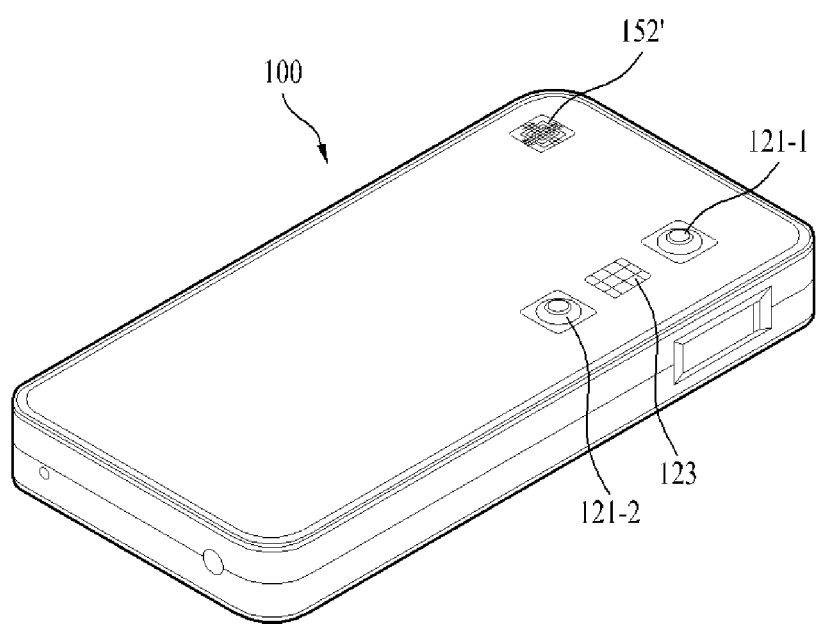
FIG. 7 is a rear perspective diagram for one example of a mobile terminal capable of creating a 3D stereoscopic image.

FIG. 7 is a rear perspective diagram for one example of a mobile terminal capable of creating a 3D stereoscopic image.

Referring to FIG. 7, a pair of cameras 121-1 and 121-2 are additionally installed at the backside of the terminal body, and more particularly, at the rear case 102. A pair of the cameras 121-1 and 121-2 are arranged by being spaced apart in a prescribed distance from each other. And, each of the cameras 121-1 and 121-2 may have pixels different from those of the former camera 121 provided to the front side shown in FIG. 1. Preferably, each of the cameras 121-1 and 121-2 may have the same number of pixels and the same view angle. Thus, a pair of the cameras 121-1 and 121-2 are arranged in a manner of being spaced in a prescribed distance from each other. This is because one object can be photographed at the same time in different views using a pair of the cameras 121-1 and 121-2. In particular, one of the cameras 121-1 and 121-2 photographs a left eye image, while the other photographs a right eye image. And, a source image may be created by processing the photographed images by a method that will be described later.

A flash 123 may be additionally arranged in the vicinity of the cameras 121-1 and 121-2. The flash 123 may apply illumination to an object when the object is photographed via at least one of the cameras 121-1 and 121-2.

An audio output unit 152' may be additionally provided to the backside of the terminal body. The audio output unit 152' may be able to implement a stereo function together with the former audio output unit 152 shown in FIG. 2. And, the audio output unit 152' may be usable to implement a speaker phone mode in the course of a phone call.

In the following description, a general method of creating a source image and a method of outputting a 3D stereoscopic image using the created source image are explained with reference to FIG. 8.

Figure 8:
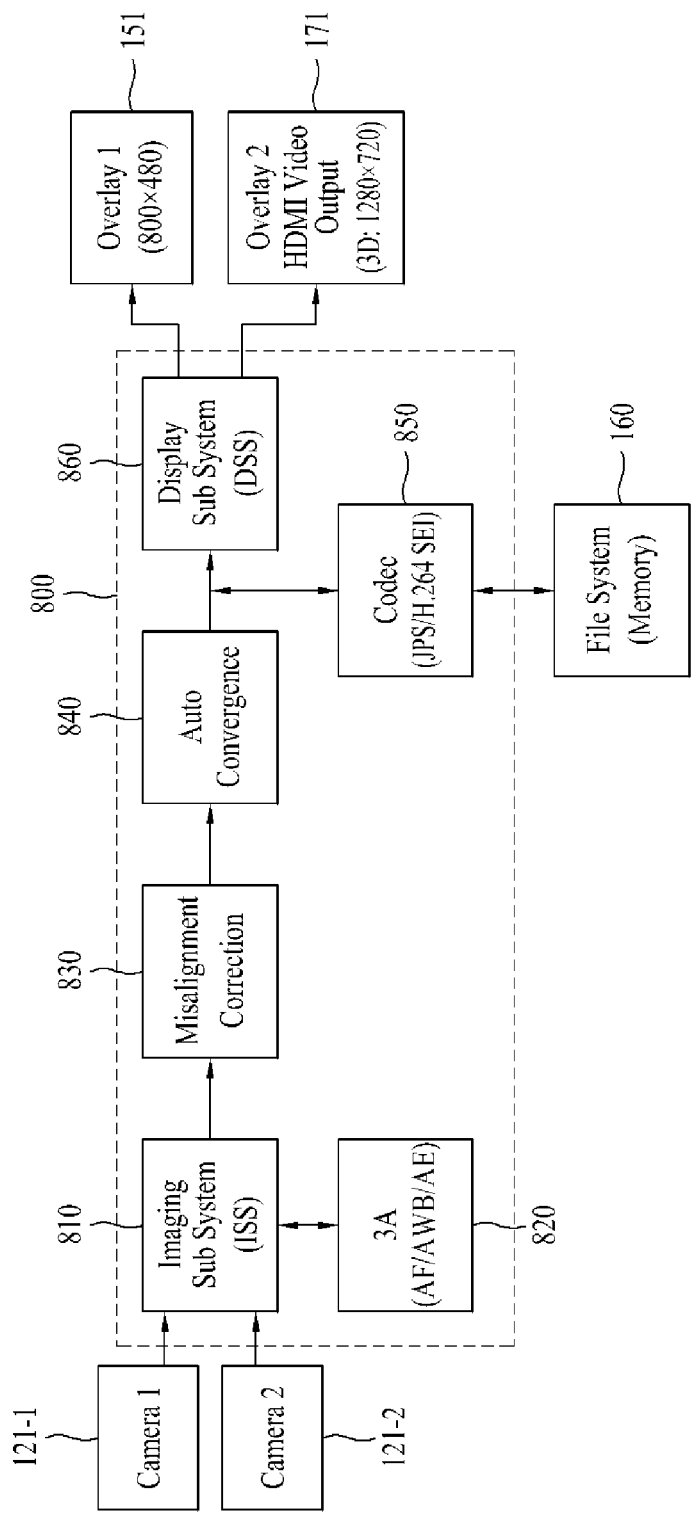
FIG. 8 is a block diagram for one example of a mobile terminal configured to create and output a source image for implementing a 3D stereoscopic image.

FIG. 8 is a block diagram for one example of a mobile terminal configured to create and output a source image for implementing a 3D stereoscopic image.

For clarity of the following description, FIG. 8 shows components for creating, saving and playing a 3D stereoscopic image only. Hence, a mobile terminal according to the present invention may further include more components. A plurality of the components shown in FIG. 8 are classified by functions only. In case that a mobile terminal is configured, functions performed by a plurality of components may be integrated into a single module. On the contrary, a function performed by a single component may be performed by a plurality of modules.

Referring to FIG. 8, a mobile terminal configured to implement a 3D stereoscopic image may include a pair of cameras 121-1 and 121-2, an imaging subsystem (ISS) 810, a 3A (AF, AWB, AE) processing module 820, a misalignment correction module 830, an audio convergence module 840, a codec 850, a display subsystem (DSS) 860, a memory 160, a display unit 151 or overlay 1 and an HDMI video output 171 or overlay 2.

In the following description, a source image creating method and a source image outputting method are explained together with functions of the respective components.

First of all, in order to create a source image, images are photographed via a pair of the cameras 121-1 and 121-2, respectively, and are then transferred to the imaging subsystem 810. The imaging subsystem 810 performs a function of processing electric signals received from the cameras 121-1 and 121-2 and converting the received electric signals to image data. Subsequently, 3A correction may be performed on each of the image data by the 3A processing module 820. In particular, synchronization for 3A is performed on the image data created from the camera in charge of a left eye image and the image data created from the camera in charge of a right eye image. In this case, the 3A means AF (auto focus), AWB (auto white balance) as a reference for color sense, and AE (auto exposure) for adjusting an exposure.

After the left eye image data and the right eye image data have been created by the above-described process, a processing for creating a source image to implement a 3D stereoscopic image is performed using the left eye image data and the right eye image data. In particular, distortion or deformation of the left/right eye image data is corrected in a manner of adjusting X-, Y- and z-axis correction, rotation, focal length and the like via the misalignment correction module 830. Thereafter, convergence of the left and right eye image data is performed to provide a 3D effect by the auto convergence module 840. After completion of this process, a prototype of one source image having the left and right eye image data arranged together side by side or top to bottom is completed. The prototype of the source image is converted to a source image file by being converted and/or compressed into a format suitable for storage. This source image file may be saved in the memory 160.

In the following description, a method of playing back a 3D stereoscopic image using a source image is explained. The source image created by the above-described method may be directly played. Alternatively, the source image may include the one saved in the memory 160 by the above-described method or a different method. In the following description, assume a case that the source image is saved in the memory 160.

First of all, the source image saved in the memory 160 is decompressed or converted to a playable form by the codec 850 and is then forwarded to the display subsystem 860. Subsequently, the display subsystem 860 performs a formatting job such as a resolution change to output a 3D stereoscopic image via the display unit 151 of a parallax barrier type and the like on the side-by-side or top-to-bottom arranged image converted by the codec. The formatted image is forwarded to the display unit 151 and is then used for the implementation of the 3D stereoscopic image. In case of attempting to output the 3D stereoscopic image via an external display device, a formatting of a suitable format (e.g., 1280 720 resolution for HDMI format) may be performed in accordance with a system connected via the HDMI video output 171. In doing so, the external display device may be implemented with any system capable of outputting a 3D stereoscopic image. In particular, the connecting system may conceptionally include such a wired interface as a universal serial bus (USB), a high definition multimedia interface (HDMI), a super video (S-video), a digital visual interface (DVI), a D-subminiature (D-SUB), an AV terminal and the like.

Optionally, the components described with reference to FIG. 8 except the cameras 1 and 2 121-1, 121-2, the display unit 151 and the HDMI video output 171 may be integrated into a DSP (digital signal processor) chip 800 to implement the functions of their own.

Yet, the method described with reference to FIG. 8 may have difficulty in solving the brightness lowered problem caused when a 3D stereoscopic image is outputted from a switching panel type display unit.

Configuration and Operation of Mobile Terminal for the Solution of Brightness Problem In order to solve the above problem, a mobile terminal according to one embodiment of the present invention is proposed to optimize gamma, brightness/color and gain in accordance with information on brightness of a camera or a 3D content to play and to adjust brightness of a display unit. This is described with reference to FIG. 9 as follows.

Figure 9:
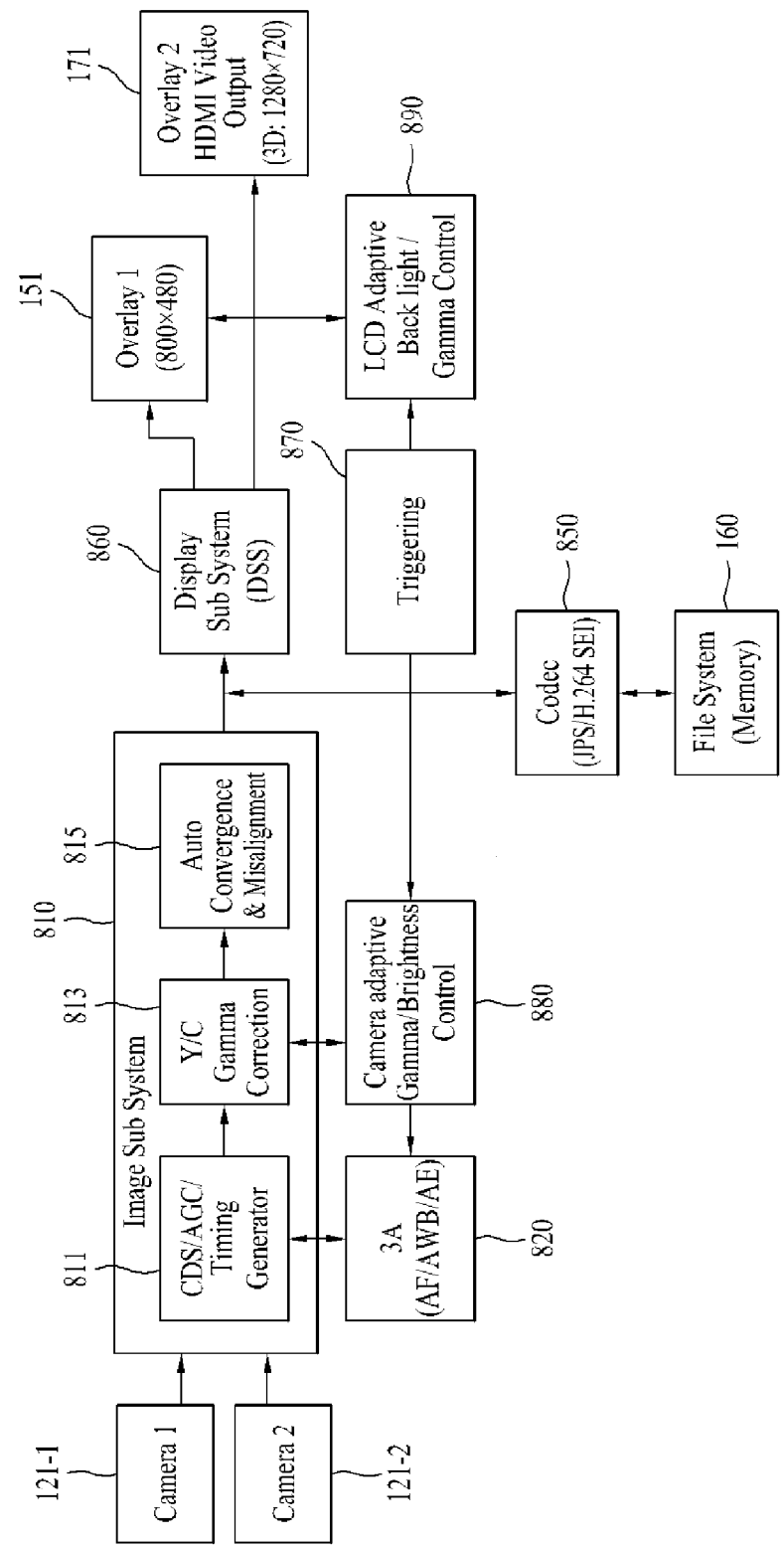
FIG. 9 is a block diagram for one example of a mobile terminal configuration to implement a brightness corrected 3D stereoscopic image according to one embodiment of the present invention.

FIG. 9 is a block diagram for one example of a mobile terminal configuration to implement a brightness corrected 3D stereoscopic image according to one embodiment of the present invention.

Referring to FIG. 9, since a mobile terminal for implementing a 3D stereoscopic image according to one embodiment of the present invention has the configuration similar to that shown in FIG. 8, details of the parts overlapping with the former parts shown in FIG. 8 will be omitted for clarity.

Unlike FIG. 8, FIG. 9 shows that an imaging system 810 includes a CDS & AGC (correlated double sampling hold and auto gain control) module 811, a Y/C (brightness/color) gamma correction module 813 and a misalignment correction & auto convergence module 815.

In particular, the misalignment correction & auto convergence module 815 may be able to perform both of the function performed by the misalignment correction module 830 described with reference to FIG. 8 and the function performed by the auto convergence module 840 described with reference to FIG. 8. Of course, the two functions may be independent from each other, as shown in FIG. 8. Alternatively, the two functions may be assigned outside the image subsystem. The CDS & AGC module 811 may perform a function of reading a reference value and a signal value and then finding a pure signal level from a difference of the read values to remove a noise generated from interpreting a signal-processed pixel inputted from a camera and a function of preventing a signal saturation by controlling a gain (or sensitivity (or reception)) in case of an input of a signal at a strong level that exceeds a regulation or a function of maintaining a predetermined level raised up to a level of regulation in case of a weak signal. The Y/G gamma correction module 813 may literally perform brightness/color and gamma correction on an image signal processed by the CDS & AGC module 811. In this case, the gamma and brightness correction may be performed under the control of a camera adaptive gamma/brightness control module 880. In doing so, the gamma may mean brightness distribution of an image signal and may be controlled in a manner of converting an input contrast value to an output contrast value by shifting a gamma point through a gamma control. The camera adaptive gamma/brightness control module 880 may be able to control the 3A module 820 as well and may particularly improve a brightness of an image signal inputted from a camera by controlling an auto exposure (AE).

Meanwhile, a triggering module 870 determines whether a photograph/play mode is the mode for photographing/playing a 3D stereoscopic image. If the photograph mode is determined as the 3D stereoscopic image photograph mode, the triggering module 870 activates the camera adaptive gamma/brightness control module 880 and then enables the camera adaptive gamma/brightness control module 880 to perform a brightness adjustment of an image signal inputted from a camera. If the triggering module 870 determines that the 3D stereoscopic image play mode is activated, an LCD adaptive backlight/gamma control module 890 is activated to enhance a brightness of an output overlay image or to raise a brightness of the display unit. The brightness enhancement of the output overlay image may be performed to raise a gamma value of an output image signal forwarded to the display unit 151. And, the brightness of the display unit may be raised in a manner of increasing an output of an LCD backlight.

Creation of Source Image

Based on the description of the aforementioned components, a source image creating method according to the present invention is explained as follows.

First of all, in order to create a source image, images are taken via the two cameras 121-1 and 121-2 and are then transmitted to the imaging subsystem 810. Subsequently, the triggering module 870 determines whether a photograph mode is the mode for creating a source image of a 3D stereoscopic image or the mode for a normal 2D image photographing. As a result of the determination, if the photograph mode is the mode for creating the source image of the 3D stereoscopic image, the triggering module 870 activates the camera adaptive gamma/brightness control module 880. The camera adaptive gamma/brightness control module 880 may control the 3A module 820 and the Y/C gamma correction module 813 to enhance the brightness of the signal-processed image information. In particular, when an image signal inputted from the camera is processed by the CDS & AGC module 811 under the control of the 3A module 820, an auto exposure (AE) value is adjusted to enhance the brightness of the image.

The image signal processed by the CDS & AGC module 811 may undergo the brightness/color and gamma correction by the Y/C (brightness/color) gamma correction module 813.

In doing so, the camera adaptive gamma/brightness control module 880 determines whether to enhance the brightness via the AE value, to enhance the brightness via the gamma value, or to use both. In particular, whether the camera adaptive gamma/brightness control module 880 enhances the brightness by adjusting the AE value or the gamma value may variably depend on a level of brightness lost in the operation of a switching panel, an average brightness of the image signals inputted from the two cameras, a distribution state of a specific signal band or the like. Moreover, when a level of correction is determined, a level of the brightness, which will be lowered on operating the switching panel, may be taken into consideration for the brightness on playing the image signal inputted from the camera in a normal 2D mode. In particular, the level of the brightness correction preferably amounts to a value of compensation for the brightness to be attenuated by the switching panel. Meanwhile, a loss of gradation attributed to the AE and/or gamma correction may be restricted from exceeding a predetermined range or a brightness enhanced level previously set by a user.

The brightness enhanced image by the above-described process has the distortion or deformation of the left-right eye image data corrected by the misalignment correction and auto convergence module 815 and the convergence of the left and right eye image data is then performed to provide a 3D effect. After completion of this process, a prototype of a single source image, in which the brightness enhanced left and right eye image data are arranged in horizontal direction (i.e., side by side) or vertical direction (i.e., top to bottom) together, is completed. The prototype of the source image is converted to a source image file by being converted and/or compressed into a format suitable for storage by the codec 850. Finally, this source image file may be saved in the memory 160.

Playback of 3D Stereoscopic Image Using Source Image

In the following description, a method of playing back a 3D stereoscopic image using a source image is explained. After a source image has been created by the above-described process, the created source image may be directly played back. A source image may be previously saved in the memory 160 by the above-described method or another method. A source image may be downloaded or streamed by real time. In the following description, assume a case that source image is saved in the memory.

First of all, when a 3D stereoscopic image is played via a display unit of a parallax barrier type using a source image, a play process difference is generated in accordance with whether a brightness of a source image is previously enhanced by the aforementioned process.

In particular, in case that a brightness of a source image is previously enhanced, as mentioned in the foregoing description with reference to FIG. 8, a general play process may be followed. Yet, in case that a processing for canceling out the brightness attenuation caused by a switching panel is not sufficiently applied due to such a reason as a damage on gradation and the like, a brightness of a backlight of a display unit may be adaptively and additionally raised for supplementary brightness. In case that brightness enhancement for a source image is not performed at all, it may be able to raise a gamma value of an output image or a backlight brightness.

The source image saved in the memory 160 is delivered to the display subsystem 860 by being decompressed or converted to a format for playback by the codec 850. In doing so, the triggering module 870 checks a current play mode and then determines whether the current play mode is a 3D stereoscopic image play mode using a switching panel. In case of a 3D stereoscopic image, the triggering module 870 determines a brightness of the source image. As a result of the determination, if the play mode is a 2D mode or the brightness of the source image is adjusted previously and sufficiently despite a 3D mode, a general play procedure may be followed.

In determining a brightness of a source image and a correction level, the triggering module 870 may calculate a brightness, which is to attenuate when a switching panel is operating, in a manner of calculating an average brightness value of the source image itself and then comparing the calculated the average brightness value to a reference value set by a user or a reference value previously set in the system or with reference to a brightness of a playback in 2D mode. Through this, the triggering module 870 may be able to determine whether to perform a correction. If the triggering module 870 determines to perform the correction, the triggering module 870 may be able to determine whether to use the gamma adjustment only or whether to perform a brightness adjustment of an LCD backlight together with the gamma adjustment.

In particular, in case that the brightness adjustment of the source image is not previously completed or that the brightness adjustment of the source image is not sufficient, the LCD adaptive backlight/gamma control module 890 is activated to perform the brightness enhancement of an output overlay image and/or the brightness adjustment of the display unit 151 it self if necessary.

For instance, when an LCD backlight of the display unit 151 is controlled, the LCD adaptive backlight/gamma control module 890 calculates an optimal brightness value in consideration of a 2D brightness setup value and a gamma value of a source image to obtain an optimal brightness. In doing so, a level of the optimal brightness correction may amount to a value of compensating for the brightness that will be attenuated by the switching panel. Meanwhile, the correction of the gamma value may be restricted to prevent a loss of gradation from exceeding a predetermined range or a brightness enhanced level previously set up by a user.

In the following description, one example of gamma correction is explained with reference to FIG. 10. When a source image is created, the gamma correction may be performed by the Y/C gamma correction module 813. When a 3D stereoscopic image is played back, the gamma correction may be performed by the LCD adaptive backlight/gamma control module 890.

Figure 10A:
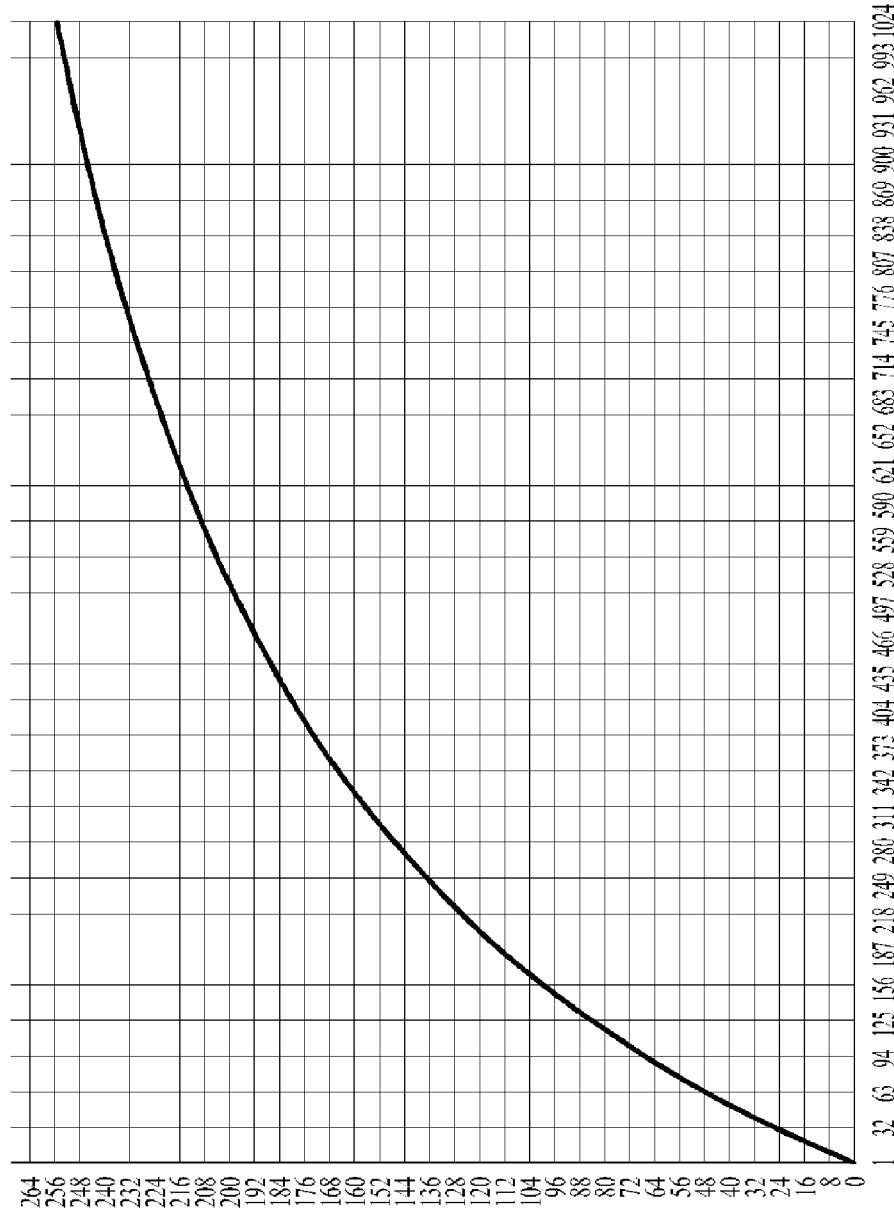
FIGS. 10A and 10B are diagrams for one example of a curve modification for gamma correction according to one embodiment of the present invention.
Figure 10B:
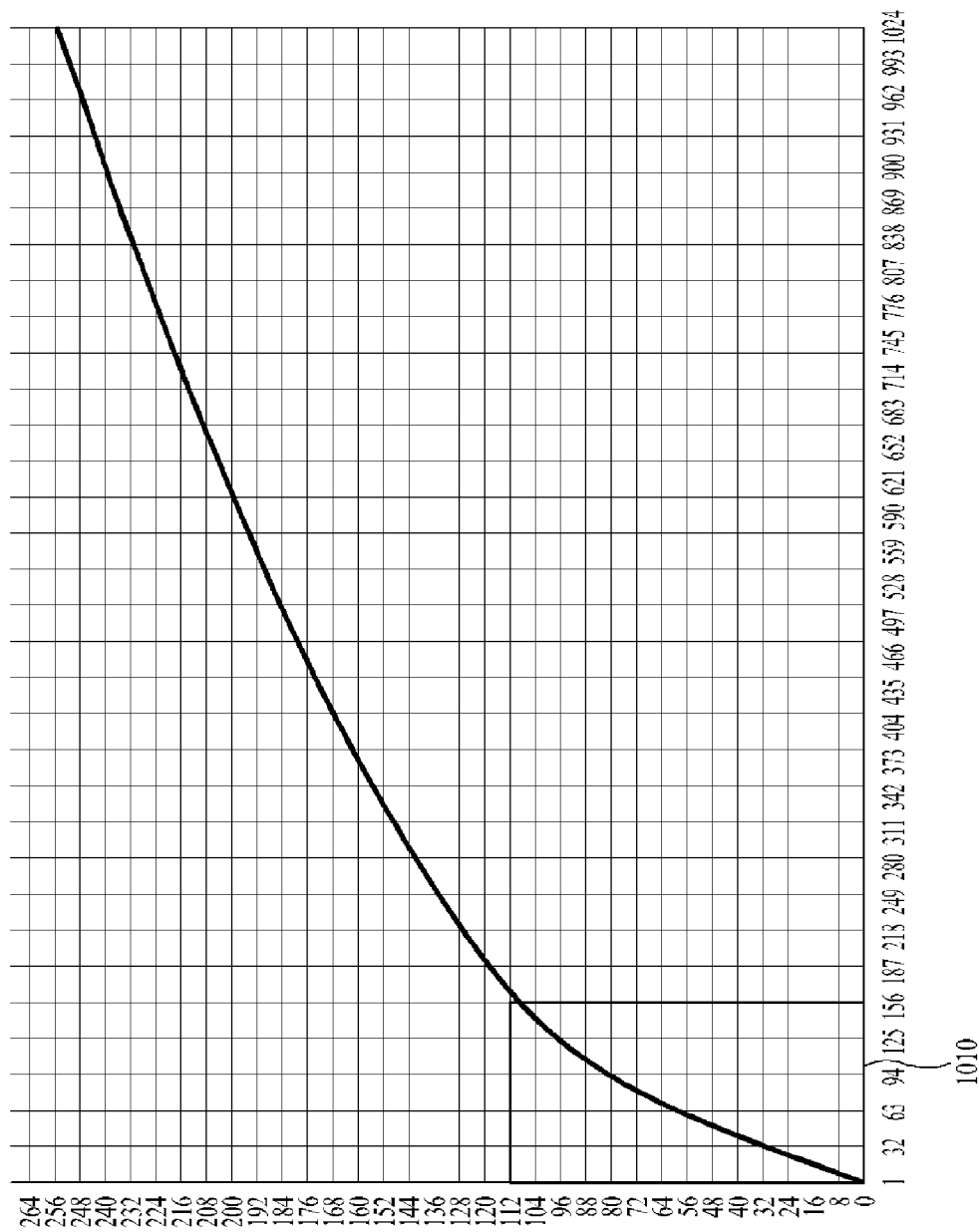

FIGS. 10A and 10B are diagrams for one example of a curve modification for gamma correction according to one embodiment of the present invention.

FIG. 10A shows a graph of a gamma curve for a normal 2D/3D output, while FIG. 10B shows a graph of a corrected gamma curve according to one embodiment of the present invention. In each of the graphs, a horizontal axis indicates a brightness of an input image and a vertical axis indicates a brightness of an output image. Comparing the curves shown in FIGS. 10A and 10B to each other, a slope of a dark region 1010 of an input value in FIG. 10B is set steeper than that in FIG. 10A. Hence, an output brightness of the dark part becomes higher than others.

Meanwhile, in the above-described playing method, it is explained that the triggering module 870 directly determined whether the brightness of the source image is sufficient. Yet, how much the brightness of the creating process is performed is made to be recorded as a prescribed meta data tag in a file and the triggering module 870 is made to determine whether to perform the brightness correction more quickly in playback with reference to meta data. Since whether to play a 3D stereoscopic image may be frequently changeable into a 2D mode in accordance with a user's command input in the course of playback as well as in case of an initial playback, the triggering module 870 may be set to determine whether a mode is changed by periods/real time. If the mode is changed, the controller 180 may be able to inform the triggering module 870 that the mode has been changed.

Adaptive Brightness Setting in Consideration of Ambient Environment

According to another embodiment of the present invention, it is proposed that a brightness of a display unit is changed in consideration of an ambient brightness in case of outputting a 3D stereoscopic image in addition to the aforementioned brightness enhancing method. In particular, the aforementioned LCD adaptive backlight/gamma control module 890 may be set to adaptively adjust an LCD backlight brightness in accordance with an ambient brightness. Through this, even if a user appreciates a 3D stereoscopic image in a relatively dark place, it may be able to prevent visual inconvenience in raising the brightness uniformly. This is described with reference to FIG. 11 and FIG. 12 as follows.

Figure 12:
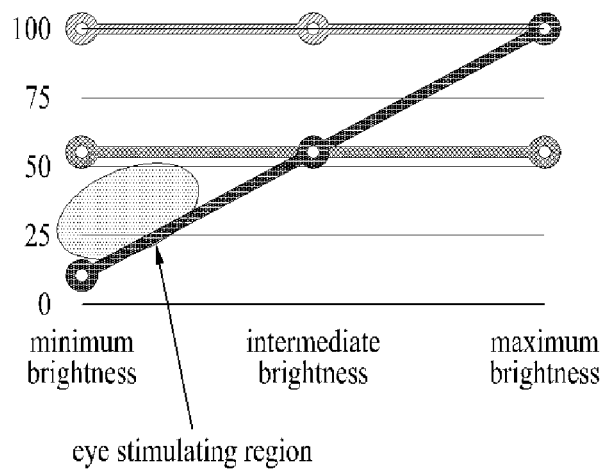
FIG. 12 is a diagram for another example of adaptive brightness adjustment according to another embodiment of the present invention.
Figure 12:
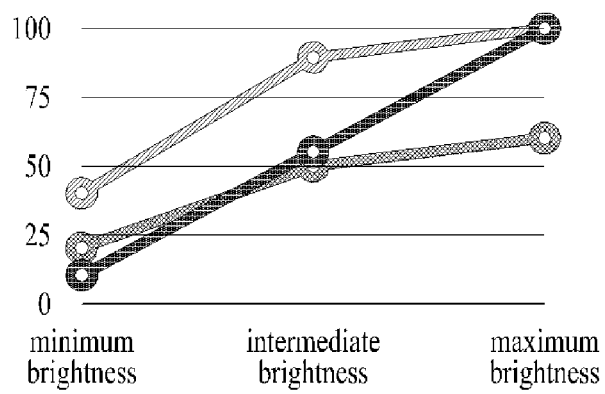

FIG. 12 is a diagram for one example of adaptive brightness adjustment according to another embodiment of the present invention.

Referring to FIG. 12, assuming a case that a display panel of a display unit includes an LCD of a backlight type, a horizontal axis and a vertical axis in a brightness graph indicate an ambient brightness and a brightness of an LCD backlight, respectively. In this case, the ambient brightness may be obtained by the controller 180 via an illumination intensity sensor provided to the mobile terminal.

Referring to FIG. 12(a), in a 2D mode, a brightness of an LCD backlight is controlled to be sequentially raised in proportion to an ambient brightness. Yet, in a 3D mode, the brightness of the LCD backlight is set to a maximum value to compensate for a brightness attenuation of a switching panel irrespective of the ambient brightness. In this case, as a brightness actually sensed by a user becomes the brightness attenuated by the switching panel irrespective of the ambient brightness, since the brightness of the backlight is relatively strong in case of a dark ambience, it may stimulate user's eyes excessively. Hence, an output of the LCD backlight may be adjusted to a user sensed value similar to a 2D brightness in accordance with the ambient brightness, as shown in FIG. 12(b).

The above-described backlight brightness adjusting method is described in another viewpoint with reference to FIG. 11 as follows.

Figure 11:
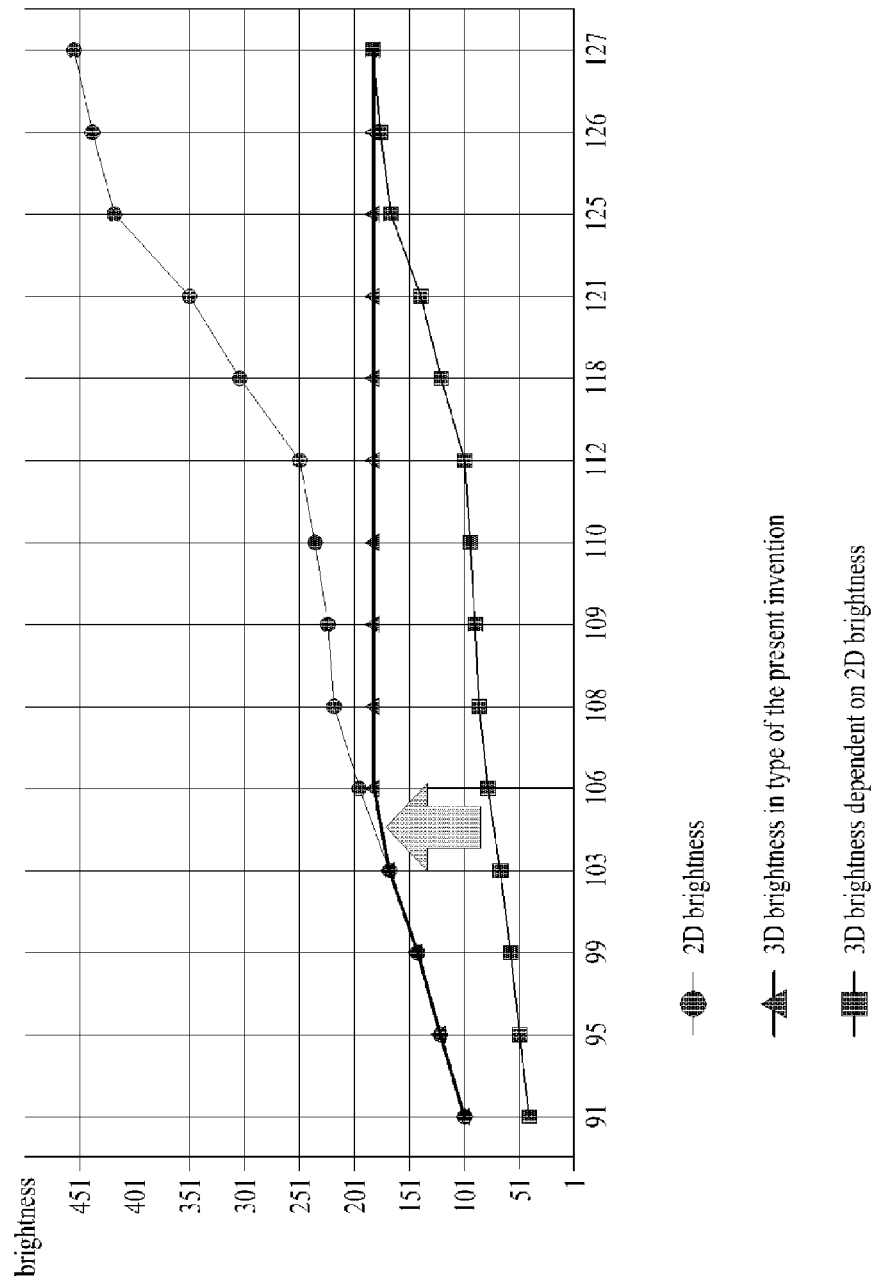
FIG. 11 is a diagram for one example of adaptive brightness adjustment according to another embodiment of the present invention.

FIG. 11 is a diagram for another example of adaptive brightness adjustment according to another embodiment of the present invention, in which a vertical axis indicates a brightness actually sensed by a user.

Referring to FIG. 11, when a backlight brightness applied to a 2D output in consideration of an ambient brightness is intactly applied to a 3D output, it may cause such a problem that a user senses that a brightness of a 3D output image is always lower than that of a 2D output image. Hence, a backlight brightness is adjusted up to a brightness limit by a switching panel as similar to a 2D brightness as possible. And, the adjusted backlight brightness may be set to be maintained from the limit. Through this, it may be able to reduce user's visual fatigue possibly caused in a dark ambience.

One example of the corresponding mathematization is represented as Formula 1.

K=2D, if 2D brightness is equal to or lower than 180.

K=180, if 2D brightness is higher than 180. [Formula 1]

In Formula 1, 'K' indicates a brightness of a 3D output image. And, Formula 1 assumes a case that a maximum brightness is 180 in case of a 3D output, as shown in FIG. 12. Hence, if a 2D brightness is equal to or lower than 180, a 3D brightness is set higher than 2D. If the 2D rightness exceeds 180, the 3D brightness is fixed to 180.

User Interface

In the following description, one example of a process for playing back a 2D/3D image in a mobile terminal according to one embodiment of the present invention and one example of a corresponding menu configuration are explained with reference to FIG. 13.

Figure 13:
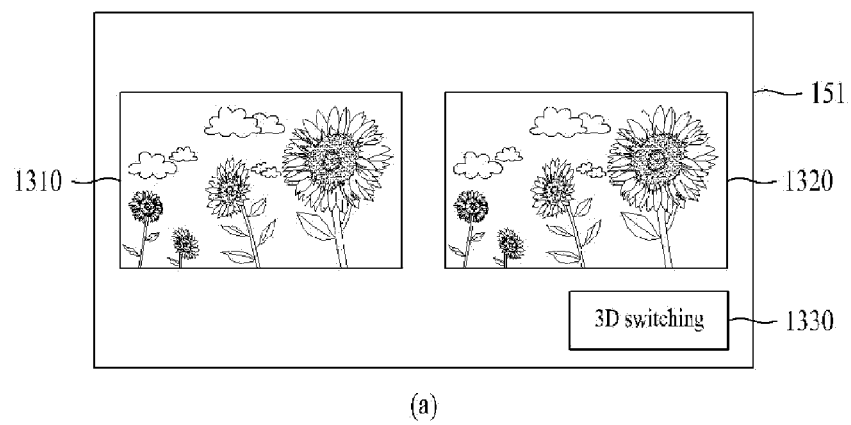
FIG. 13 is a diagram for one example to illustrate a process for playing back a 2D image/3D stereoscopic image in a mobile terminal according to one embodiment of the present invention and a menu configuration therein.
Figure 13:
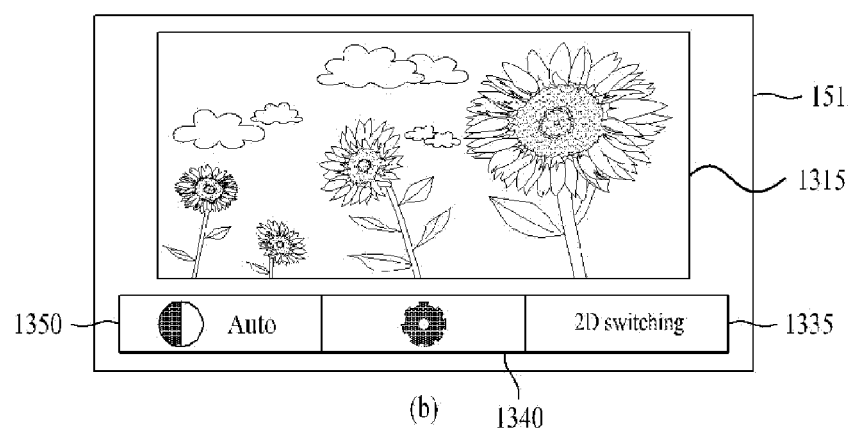
Figure 13:
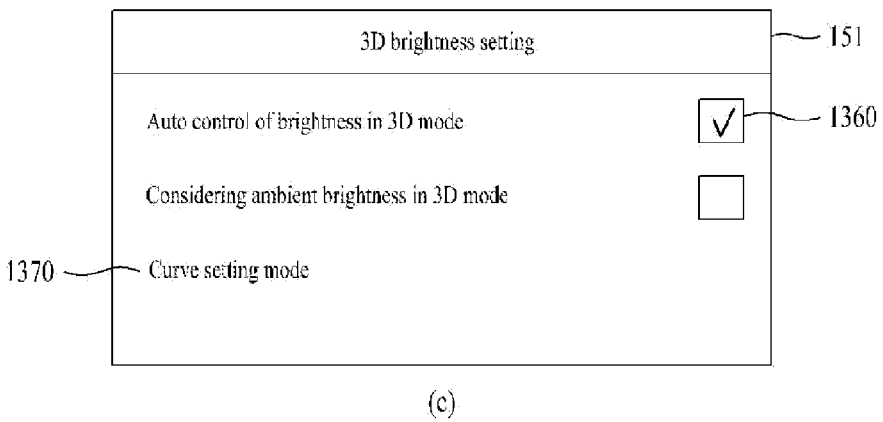

FIG. 13 is a diagram for one example to illustrate a process for playing back a 2D image/3D stereoscopic image in a mobile terminal according to one embodiment of the present invention and a menu configuration therein.

FIG. 13 (a) shows one example of playing back a source image of a 3D stereoscopic image in a 2D mode. In a source image of a 3D stereoscopic image according to the present invention, each of a left eye image and a right eye image is individually arranged in a prescribed form. If the prescribed form is a side-by-side format, referring to FIG. 13 (a), a left eye image 1310 and a right eye image 1320 are displayed side by side. In this case, an icon 1330 for switching a mode to a 3D stereoscopic image mode may be additionally displayed.

If a mode switching button 1330 is selected in the course of playing back or stopping playing an image, referring to FIG. 13 (b), a switching panel of a display unit 151 is activated and a 3D stereoscopic image 1315 may be displayed. Moreover, an icon 1350 for selecting whether the aforementioned brightness enhancing method will be applied, an icon 1340 for entering a setting menu for the brightness enhancing method, an icon 1335 for switching to a 2D mode and the like may be displayed on the display unit 151. If the aforementioned brightness enhancing function or the brightness adjusting function in consideration of the ambient brightness is set to be always applied in a 3D mode, when the mode switching button 1330 is selected and the 3D mode is then entered, a brightness of a 3D stereoscopic image is automatically enhanced. In case that the brightness is enhanced, a popup window (not shown in the drawing) may be displayed to indicate that the brightness is enhanced. And, the icon 1350 for selecting whether the aforementioned brightness enhancing method will be applied, the icon 1340 for entering the setting menu for the brightness enhancing method, the icon 1335 for switching to the 2D mode and the like may be displayed on the popup window together. If the icon 1335 for switching to the 2D mode is selected, the brightness enhancing function is ended and a normal 2D image playback may be then performed.

If the icon 1340 for entering the setting menu for the brightness enhancing method is selected or the setting menu is entered via a prescribed menu manipulation, a setting menu shown in FIG. 13 (*c*) may be displayed. In this case, whether to apply the aforementioned brightness enhancing function or the backlight brightness adjusting function in consideration of the ambient brightness may be set via a check box 1360. Moreover, a menu 1370 for adjusting the curve described with reference to FIG. 10 via a direct touch input or the like may be provided.

Meanwhile, although the description with reference to FIG. 13 is made on the basis of an image playback, a user interface similar to that shown in FIG. 13 may be applicable to a photographing. In particular, the user interface similar to that shown in FIG. 13 (*a*) may be provided in case of a 2D mode photographing. If the mode switching button 1330 is selected, a 3D photographing mode of a type similar to that shown in FIG. 13 (*b*) may be entered. In doing so, if a source image is set to be created by automatically enhancing a brightness, the brightness of the source image may be enhanced by the aforementioned AE or gamma value control. Moreover, if the brightness of the source image is enhanced, a popup window (not shown in the drawing) may be displayed to indicate that the brightness of the source image is enhanced. And, the icon 1350 for selecting whether the aforementioned brightness enhancing method will be applied, the icon 1340 for entering the setting menu for the brightness enhancing method, the icon 1335 for switching to the photographing 2D mode and the like may be displayed on the popup window together. If the icon 1335 for switching to the 2D photographing mode is selected, the brightness enhancing function of the source image is ended and a normal 2D image photographing may be then performed.

In the following description, a curve setting mode is explained with reference to FIG. 14.

Figure 14:
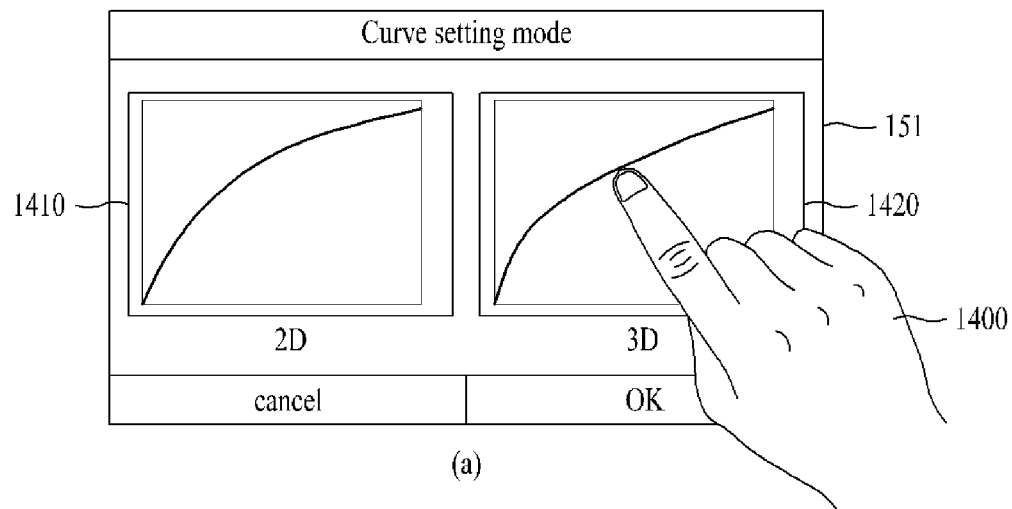
FIG. 14 is a diagram for one example of a menu configuration in a curve setting mode for a brightness modification setting of 2D/3D mode in a mobile terminal according to one embodiment of the present invention.
Figure 14:
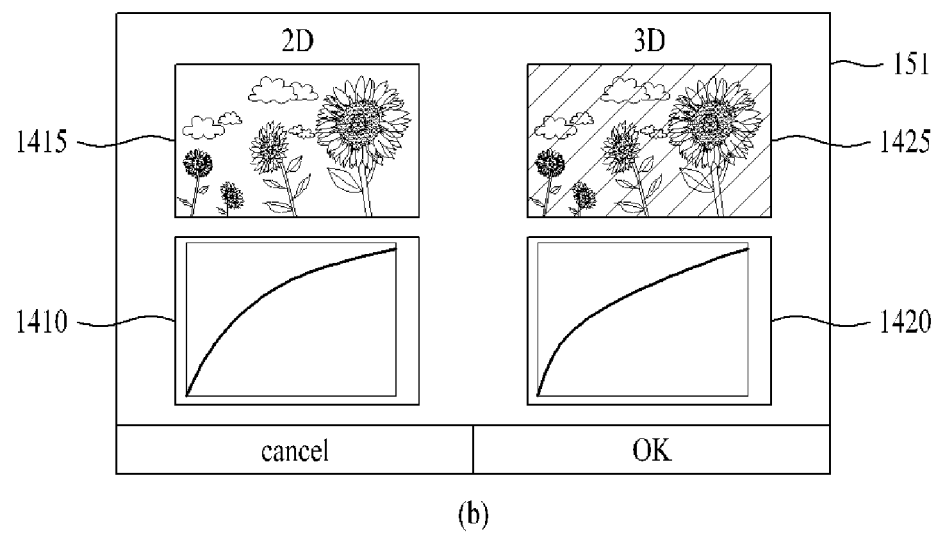

FIG. 14 is a diagram for one example of a menu configuration in a curve setting mode for a brightness modification setting of 2D/3D mode in a mobile terminal according to one embodiment of the present invention.

In FIG. 14, assume a case that the menu 1370 for adjusting the curve via a direct touch input or the like in FIG. 13 (*c*) is selected, for example, by which the present invention may be non-limited. And, the present invention may apply to various command input systems.

Referring to FIG. 14 (*a*), in a curve setting mode, a curve 1410 applying to a 2D mode and a curve 1420 applying to a 3D mode may be displayed together. A user may be able to modify a curve form by a touch input via a pointer 1400 in the present menu. In dong so, referring to FIG. 14 (*b*), in order to directly indicate an effect attributed to the curve modification, preview images 1415 and 1425 may be respectively displayed.

In particular, a brightness of the preview image 1415 corresponding to the curve 1420 of the 3D mode may be displayed in a manner that a brightness attenuated by a switching panel is applied. In more particular, the brightness of the preview image 1425 corresponding to the curve 1420 of the 3D mode may be displayed at the brightness actually sensed by a user when the switching panel is active. Hence, the user may be able to perform the curve modification by comparing the brightness of the 2D image and the brightness of the 3D image to each other through the menu shown in FIG. 14 (*b*) or the like.

The above-described 3D stereoscopic image creating and outputting method via the brightness control is described with reference to the image display device provided with the parallax barrier type displayed unit for example, by which the present invention may be non-limited. And, the present invention may apply to any kind of display configuration in which an output brightness is attenuated in the course of outputting a 3D stereoscopic image.

Meanwhile, in case that a playback of a 3D stereoscopic image is performed only, a mobile terminal according to the present invention may be implemented in a manner that at least one portion of two cameras 151-1 and 151-2 and a device configuration for processing images taken via the two cameras 151-1 and 151-2 into a source image is omitted. On the contrary, in case of a creation of a 3D stereoscopic image is performed only, a mobile terminal according to the present invention may be implemented in a manner that at least one portion of a device configuration for a display is omitted.

Besides, at least one portion of the respective components shown in FIG. 9 may be implemented into the controller 180 described with reference to FIG. 1. Moreover, a value of a brightness attenuated in the course of operating a switching panel or an attenuation rate therein may be calculated and saved in the memory in advance.

Accordingly, the present invention provides the following effects and/or advantages.

First of all, the present invention minimizes a brightness difference between a 3D stereoscopic image and a 2D image using a display device according to at least one embodiment of the present invention, thereby providing a user with a more comfortable environment for appreciating the 3D stereoscopic image.

Secondly, the present invention adjusts a brightness of a 3D image in accordance with an appreciation environment, thereby minimizing visual inconvenience in appreciating a 3D stereoscopic image.

Thirdly, the present invention creates a source image of a 3D stereoscopic image in consideration of brightness adjustment using at least two cameras.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments of the image display device and the mobile terminal are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a first camera configured to photograph a left eye image of a source image to implement a 3D (3-dimensional) stereoscopic image;
   a second camera configured to photograph a right eye image of the source image to implement the 3D stereoscopic image;
   a parallax barrier display comprising a backlight and configured to selectively display a 2D (2-dimensional) image and the 3D stereoscopic image;
   a memory; and
   a controller configured to:
      control the first camera and the second camera to adjust a brightness level of each of the left eye image and the right eye image when a photograph mode is set to a 3D stereoscopic image photograph mode;
      cause the memory to store the source image including the left eye image and the right eye image;
      control the display to adjust an output brightness level of the backlight adaptively based on a brightness level of the source image, an ambient brightness level, and a play mode for the source image, the play mode comprising a 2D image play mode and a 3D stereoscopic image play mode;
      increase the output brightness level in proportion to the ambient brightness level when the source image is displayed in the 2D image play mode;
      increase the output brightness level in proportion to the ambient brightness level up to a maximum output brightness level set for the 3D stereoscopic image play mode, the maximum output brightness level corresponding to a first ambient brightness level, when the source image is displayed in the 3D stereoscopic image play mode such that the output brightness level for the 3D stereoscopic image play mode is maintained at the maximum output brightness level even when the ambient brightness level is greater than the first ambient brightness level while the output brightness level for the 2D image play mode is increased to a level that exceeds the maximum output brightness level when the ambient brightness level is greater than the first ambient brightness level;
      cause the display to display a first icon for switching to the 2D image play mode while the 3D stereoscopic image is displayed in the 3D stereoscopic image play mode;
      cause the display to display the 2D image in response to an input applied via the first icon, the displayed 2D image comprising the left eye image and the right eye image that are arranged individually; and
      cause the display to display a second icon for switching to the 3D stereoscopic image play mode while the 2D image is displayed in the 2D image play mode.

2. The mobile terminal of claim 1, wherein the brightness level of the source image is adjusted by increasing at least an auto exposure (AE) value or a gamma value of each of the left eye image and the right eye image.

3. The mobile terminal of claim 2, wherein the gamma value is increased according to a preset gamma curve.

4. The mobile terminal of claim 1, wherein the controller is further configured to:
   arrange the brightness level-adjusted left eye image and right eye image in a prescribed form;
   convert the arranged images into a preset storage format; and
   control the memory to store the converted images.

5. A mobile terminal comprising:
   a first camera configured to photograph a left eye image of a source image to implement a 3D (3-dimensional) stereoscopic image;
   a second camera configured to photograph a right eye image of the source image to implement the 3D stereoscopic image;
   a parallax barrier display comprising a backlight and configured to selectively display a 2D (2-dimensional) image and the 3D stereoscopic image;
   a memory; and
   a controller configured to:
      determine a photograph mode set for the first camera and the second camera;
      increase a brightness level of an image signal generated by the first camera and the second camera when the determined photograph mode is a 3D stereoscopic image photograph mode;
      cause the memory to store the source image including the left eye image and the right eye image;
      control the display to adjust an output brightness level of the backlight adaptively based on a brightness level of the source image, an ambient brightness level, and a play mode for the source image, the play mode comprising a 2D image play mode and a 3D stereoscopic image play mode;
      increase the output brightness level in proportion to the ambient brightness level when the source image is displayed in the 2D image play mode;
      increase the output brightness level in proportion to the ambient brightness level up to a maximum output brightness level set for the 3D stereoscopic image play mode, the maximum output brightness level corresponding to a first ambient brightness level, when the source image is displayed in the 3D stereoscopic image play mode such that the output brightness level for the 3D stereoscopic image play mode is maintained at the maximum output brightness level even when the ambient brightness level is greater than the first ambient brightness level while the output brightness level for the 2D image play mode is increased to a level that exceeds the maximum output brightness level when the ambient brightness level is greater than the first ambient brightness level;
      cause the display to display a first icon for switching to the 2D image play mode while the 3D stereoscopic image is displayed in the 3D stereoscopic image play mode;
      cause the display to display the 2D image in response to an input applied via the first icon, the displayed 2D image comprising the left eye image and the right eye image that are arranged individually; and cause the display to display a second icon for switching to the 3D stereoscopic image play mode while the 2D image is displayed in the 2D image play mode.

6. The mobile terminal of claim 5, wherein the controller is further configured to increase an exposure value of the image signal.

* * * * *